United States Patent Office 3,036,974
Patented May 29, 1962

3,036,974
PRODUCTION OF POLYESTER AMIDES
Hans Georg Trieschmann, Ludwigshafen (Rhine), Lothar Reuter, Ludwigshafen (Rhine)-Oppau, and Wolfgang Arend, Ludwigshafen (Rhine), Germany, assignors to Badische Anilin- & Soda-Fabrik Aktiengesellschaft, Ludwigshafen (Rhine), Germany
No Drawing. Filed May 1, 1956, Ser. No. 581,852
10 Claims. (Cl. 260—2)

The present application is a continuation-in-part of application Serial No. 494,542 filed in the name of Hans Georg Trieschmann, Lothar Reuter, and Wolfgang Arend, on March 15, 1955, now abandoned.

This invention relates to a method of manufacturing polyester amides and to new polyester amides. More particularly, it is directed to a new method producing polyester amides by reacting an N-substituted ethylene imine with phthalic anhydride.

It is already known that the alkylene imines and their derivatives are very reactive substances capable of numerous reactions. Among such reactions, ethylene imine or its derivatives have been reacted with dicarboxylic acids or their chlorides, but the products thereof have been mixtures of unidentifiable compounds lacking technological interest.

The German patent specification No. 711,408 deals with the manufacture of nitrogeneous condensation products by reacting an alkylene imine or its polymerization products with carboxylic acids, their anhydrides or esters and discloses inter alia the reaction of maleic anhydride with polymeric ethylene imine.

It is an object of this invention to provide new resinous condensation products of N-substituted monomeric ethylene imines and phthalic anhydride.

Another object of this invention is to provide a method for the manufacture of polyester imines by the interaction of an N-substituted basic reacting ethylene imine with phthalic anhydride.

Further objects and advantages of the invention will be disclosed in the more detailed description of the invention.

These objects and advantages are accomplished by reacting an N-substituted basic reacting ethylene imine with phthalic anhydride. By this reaction there are obtained resinous condensation products containing the following recurring fundamental unit in the chain:

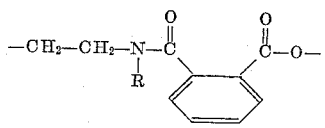

where R may be a hydrocarbon radical, for instance an alkyl, cycloalkyl, aryl or aralkyl radical, such as a methyl, ethyl, propyl, butyl, amyl, hexyl, heptyl, octyl, dodecyl, octadecyl, cyclohexyl, phenyl or benzyl radical and other unpolymerizable radicals, which may also contain various substituents, such as hydroxyl groups or chlorine atoms. The N-substituted ethylene imines are accessible for example by heating mineral acids of the corresponding N-substituted beta oxyethylamine or their salts with aqueous solutions of alkali hydroxide. Another method of manufacturing N-substituted ethylene imines consists in the decarboxylation of N-substituted oxazolidones-2 by mineral acids, as for instance hydrochloric acid. A further method for the production of such N-substituted ethylene imines consists in the conversion of N-substituted beta-chloroethyl urethanes by an alkali hydroxide to an N-substituted oxazolidone-2 which is then decarboxylated with a mineral acid.

Basic-reacting compounds which contain two or more ethylene imine radicals substituted on the nitrogen atom may also be used for the reaction. Such compounds are, for example, compounds of the general formula:

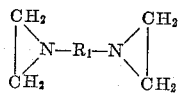

in which $R_1$ may be an unpolymerizable hydrocarbon radical, for instance an alkylene, cycloalkylene or arylene radical. The product derived from these diethylene imines and phthalic anhydrides are strongly cross-linked, difficultly soluble products.

For the manufacture of polyester amides according to this invention it is also possible, however, to react, first a basic reacting ethylene imine substituted on the nitrogen atom by a hydrocarbon radical, with an anhydride of a saturated low molecular weight monocarboxylic acid, such as acetic, propionic or butyric acid, and then heating the so obtained ester amide with a dicarboxylic acid. During this last heating step, the ester amide is converted into a polyester amide, the radical of the monocarboxylic acid being replaced by the radical of the polycarboxylic acid and the free monocarboxylic acid being formed.

The basic reacting, substituted ethylene imino compound containing from 1 to 2 substituted ethylene imino groups may also be defined by the general formula

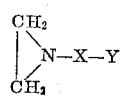

wherein X designates a hydrocarbon radical or a substituted hydrocarbon radical and Y designates a hydrogen atom or the ethylene amino radical of the formula

The reaction proceeds in general at temperatures between −20° and +220° C., preferably at from 50° to 150° C., without the addition of catalysts. Since the exothermic reaction often proceeds very rapidly, intense cooling is sometimes necessary. Cooling may be accomplished, however, by carrying out the reaction in the presence of inert solvents, such as aromatic, hydroaromatic or chlorinated hydrocarbons; i.e. these solvents are used as diluents. Water or compounds containing hydroxyl groups should as far as practicable not be present during the reaction.

The polyester amides are produced by a direct addition reaction. The reactions give practically quantitative yields. It is especially remarkable that no polyethylene imines are formed.

As a rule, about equimolecular amounts of the initial materials are used. It is also possible, however, to work with an excess of one or the other component and this may be of interest for the regulation of the chain length.

The reaction products obtainable in accordance with this invention are of particular importance for the plastic and lacquer fields. Coating lacquers on the basis of the new polyester amides which are soluble in tetra hydrofurane, butylacetate or toluene are distinguished by great firmness of attachment to glass, metal, wood, and stone. The products are also suitable for coating textiles, paper, synthetic leather, and the like. They are also well suited as adhesives, for example for metals.

The following examples will further illustrate this invention but the invention is not restricted to these examples. The parts are parts by weight.

Example 1

99 parts of N-n-butyl ethylene imine are dissolved in 500 parts of benzene. The mixture is boiled under reflux. A solution of 148 parts of phthalic anhydride in 1,500 parts of benzene is added to the mixture at the boiling temperature in the course of an hour. Two hours after the addition of the phthalic anhydride, the whole is allowed to cool. The polyester amide formed precipitates and settles in the lower part of the vessel. Without mechanical separation of the two layers, the benzene is distilled off, first at normal pressure and then in vacuo. In the flask there remain 239 parts of a light yellow resin which dissolves well in tetrahydrofurane.

Example 2

46.4 parts of phthalic anhydride and 40 parts of N-cyclohexyl ethylene imine are heated while vigorously stirring until the interaction starts, which fact may be observed by the appearance of a light yellow color. At a temperature of about 100° C. the temperature of the reaction mixture increases without additional heating; first slowly up to a temperature of 140° C., and then rapidly. The mixture is maintained at a temperature between 140° C. and 200° C. for a quarter of an hour. It is advantageous to cool the reaction mixture at temperatures above 140° C. 86 parts of a light yellow resin are obtained.

Example 3

89 parts of phthalic anhydride and 90 parts of toluene are heated to a temperature of 100° C. while stirring. A water cooled reflux condensor is provided in this case at the top with an additional reflux condensor cooled with a cooling brine or with solid carbon dioxide. In the course of one hour there are added 45 parts of N-methyl ethylene imine dissolved in 50 parts of toluene. The reaction mixture is then maintained for 3 to 4 hours at a temperature of between 100° and 120° C. Upon working up there are obtained 114 parts of a very light colored resin.

Example 4

45 parts of the reaction product of N-cyclohexyl ethylene imine and acetic acid with the formula:

$$CH_3CO-N-CH_2CH_2-O-COCH_3$$
$$\qquad\quad |$$
$$\qquad\;\; C_6H_{11}$$

and 33 parts of phthalic acid are dissolved in 50 parts of xylene and heated at a slight vacuum of about 100 mm. Hg to boiling while stirring and distilling off the released acetic acid. After 2 to 3 hours the residual acetic acid and the xylene are evaporated at a reduced pressure of and 15 mm. Hg. There are obtained 69 parts of a yellow resin.

What we claim is:

1. A resinous polyester amide consisting essentially of the recurring fundamental unit

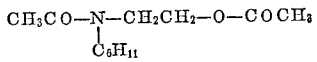

in its molecule wherein R is a monovalent hydrocarbon radical.

2. A resinous polyester amide consisting essentially of the recurring fundamental unit

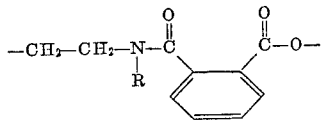

in its molecule.

3. A resinous polyester amide consisting essentially of the recurring fundamental unit.

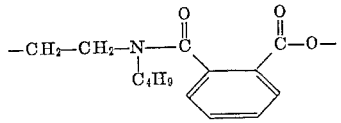

in its molecule.

4. A resinous polyester amide consisting essentially of the recurring fundamental unit

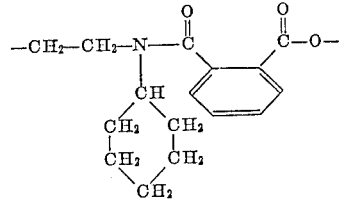

in its molecule.

5. A process for producing a resinous polyester amide which comprises reacting in an inert, liquid solvent by a direct addition reaction at −20° C. to 220° C. substantially equal molar amounts of phthalic anhydride and a basic-reacting ethylene imine substituted on the imine nitrogen by a substituent selected from the class consisting of a monovalent hydrocarbon group and the group

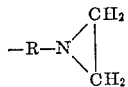

wherein R is a divalent hydrocarbon group to produce a resinous polyester amide.

6. A process as claimed in claim 5 wherein the reaction temperature is in the range of 50° C. to 150° C.

7. A process for producing a polyester amide which comprises reacting in an inert liquid solvent by a direct addition reaction at −20° C. to 220° C. substantially equal molar amounts of phthalic anhydride and N-methyl ethylene imine to produce a resinous polyester amide consisting essentially of the recurring fundamental unit

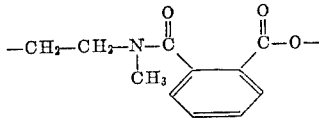

in its molecules.

8. A process for producing a polyester amide which comprises reacting in an inert liquid solvent by a direct addition reaction at −20° C. to 220° C. substantially equal molar amounts of phthalic anhydride and N-butyl ethylene imine to produce a resinous polyester amide consisting essentially of the recurring fundamental unit

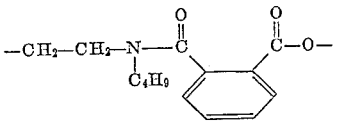

in its molecules.

9. A process for producing a polyester amide which comprises reacting in an inert liquid solvent by a direct addition reaction at −20° C. to 220° C. substantially equal molar amounts of phthalic anhydride and N-cyclohexyl ethylene imine to produce a resinous polyester amide consisting essentially of the recurring fundamental unit

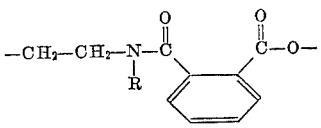

in its molecules wherein R is cyclohexyl.

10. A process for producing a polyester amide which comprises reacting at 50–150° C. in an inert, liquid solvent substantially equal molar amounts of phthalic anhydride and an ester-amide of the formula

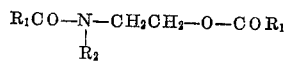

wherein $R_1$ is lower alkyl of 1–3 carbons and $R_2$ is a monovalent hydrocarbon group to produce a lower aliphatic, saturated monocarboxylic acid of 2–4 carbons and a resinous polyester amide consisting essentially of the recurring fundamental unit in its molecules

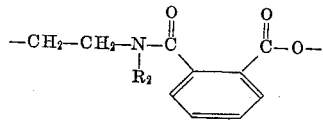

wherein $R_2$ is the same as indicated above.

References Cited in the file of this patent

UNITED STATES PATENTS

| | | |
|---|---|---|
| 2,403,533 | Kaszuba | July 9, 1946 |
| 2,440,516 | Kropa | Apr. 27, 1948 |
| 2,527,806 | Foster | Oct. 31, 1950 |
| 2,740,764 | Mischk et al. | Apr. 3, 1956 |
| 2,744,093 | Caldwell | May 1, 1956 |
| 2,779,783 | Hayes | Jan. 29, 1957 |

FOREIGN PATENTS

| | | |
|---|---|---|
| 711,408 | Germany | Oct. 1, 1941 |
| 714,585 | Germany | Dec. 3, 1941 |
| 376,929 | Great Britain | July 21, 1932 |

OTHER REFERENCES

Payne: Organic Coating Technology, vol. 1, page 288, pub. by John Wiley and Sons, Inc., New York, N.Y., 1954.

UNITED STATES PATENT OFFICE
CERTIFICATE OF CORRECTION

Patent No. 3,036,974                                        May 29, 1962

Hans Georg Trieschmann et al.

It is hereby certified that error appears in the above numbered patent requiring correction and that the said Letters Patent should read as corrected below.

In the heading to the printed specification, between lines 8 and 9, insert the following:

Claims priority, application Germany March 18, 1954

Signed and sealed this 11th day of December 1962.

(SEAL)
Attest:

ERNEST W. SWIDER                                      DAVID L. LADD
Attesting Officer                                          Commissioner of Patents